Nov. 7, 1967    J. S. METCALF ET AL    3,351,014
BIAXIALLY ORIENTED PLASTIC SHOT SHELL
Original Filed Feb. 7, 1962                    2 Sheets-Sheet 1

INVENTORS:
JOHN S. METCALF
CHARLES E. MILLER
ROY C. OLNEY
BY Donald R. Motsko
ATTORNEY 3,351,014
BIAXIALLY ORIENTED PLASTIC SHOT SHELL
John S. Metcalf, New Haven, Charles E. Miller, Hamden, and Roy C. Olney, North Haven, Conn., assignors to Olin Mathieson Chemical Corporation, a corporation of Virginia
Original application Feb. 7, 1962, Ser. No. 171,729. Divided and this application Mar. 31, 1964, Ser. No. 359,817
3 Claims. (Cl. 102—43)

ABSTRACT OF THE DISCLOSURE

A preform or blank of a crystalline olefinic polymer adapted to be formed into a one piece article having a base and a tubular sidewall of highly oriented plastic and increased tensile strength relative to the tensile strength of the base. Said preform comprising a base portion formed to substantially final finished size and shape and a relatively thick body or tubular portion formed around a central cavity or opening. The body or tubular portion is contoured to facilitate compressive deformation from a relatively thick sidewall to a relatively thin sidewall of increased strength.

---

This application is a division of application S.N. 171,729, filed Feb. 7, 1962, now abandoned, which is in turn a continuation-in-part of copending application S.N. 135,-569, filed Sept. 1, 1961.

This invention relates to the manufacture of strengthened bodies of crystalline plastics and specifically to the manufacture of hollow bodies such as the whole case of shot shells or of other shell tubes from polyolefins to obtain a desired variation of structure and properties from end to end for the purpose.

Shot shells have conventionally been made as a composite article including a metal head, a tube, usually of paper, a perforated plug in the base, and an overshot closure for the contents of shot prejectiles, propellant and various wadding. As an improvement, in U.S. Patent No. 2,232,634, for example, it was proposed to make a shot shell casing of cellulose ethers or esters such as cellulose acetate together with suitable plasticizers and fillers with the discharge end of this casing being sealed by fusion to a closure wad of the same material. But, because of the shortcomings of many plastics, such as embrittlement, contamination, and distortion resulting from loss of fugitive plasticizers, and such as the lack of adequate strength, plastic construction has not been very successful in articles likely to be put to severe useage, particularly after long storage. With most plastics, such as the first commonly known type of polyethylene, their use in shot shells has required special modifications such as inclusion of the collar of U.S. Patent No. 2,953,990 found to minimize the likelihood of failure in the case sidewall during firing. Especially with conventional, high pressure polyethylenes, such shells, unless they be suitably modified at added cost, tend to blow apart in the side wall and occasionally split lengthwise even down into the head upon firing.

In an effort to overcome the disadvantage of the use of various plastics and of separate components such as paper in shotgun shells, and in an attempt to realize the benefits of plastics such as polyethylene, those skilled in the art have tried the more rigid linear polyethylene. One approach has been to make the entire shotgun shell casing as one piece molded from linear polyethylene having a high degree of crystallization, a melting point of at least 125° C. and a relatively high density. Articles made this may by injection molding a piece of linear polymer, however, have been found to fail at normal and low temperatures when the rate of tensile strain is high as it is in ammunition cases, at the yield point, instead of elongating and recovering for satisfactory extraction from the gun barrel as a sound piece. For various reasons such as the differences in thickness and forces encountered in various sections of the shell, making it by plastic injection molding even by this approach has limitations and leaves much to be desired in obtainment of the best combination of physical properties.

Another approach has been to substitute a section of tube of such linear low pressure polyethylene for the paper tube, but not until the polymer has been oriented uniformly from end to end by stretching a tube of it to develop added strength moderately and substantially uniformly in the rigid high density linear polyolefin.

It will be appreciated that ammunition cartridges are put to rigorous use as in the firing of a shot shell case where great forces are exerted with non-uniformity and over a wide range of temperatures. Despite the deficiencies of paper in resisting charring and scuffing, in resisting occasional severance from impact, in resisting dimensional change from variation in moisture content, in preventing absorption of moisture, many of which limit the paper shell in its capacity for re-use, various plastic materials tried have shown disadvantages, especially after periods of long storage and when fired at low temperature where the defects become exaggerated; these disadvantages have seriously precluded their general use for this purpose.

One object of this invention, therefore, is to provide plastic bodies of improved effective tensile strength together with a satisfactory elastic limit and yield strength.

Another object is the provision of a novel process and blank for making such bodies economically by deformation of a blank of plastic in the solid state.

Another object is to provide an article composed of a crystalline polymer of a thermo-plastic synthetic resin formed in such a way that exceptionally high strength is obtained with desired variation adapting the article for use as a container under explosive pressure.

Another object is to economically form plastic articles having adequate strength in those portions subjected to the greatest stress.

Still another object is specifically to provide a new and improved plastic shot shell, particularly one of a suitable polyolefin.

Other objects and advantages are evident from a description of preferred embodiments, taken in connection with the accompanying drawing wherein.

In accordance with this invention, articles of manufacture, such as shot shell bodies, are formed at least in part by compression from plastic materials such as polyethylene, polypropylene and the like polymers, and/or co-polymers of the same, all finally shaped in the solid crystalline state. High density linear polyolefins specifically are contemplated for forming by compression as distinguished from forming by stretching. By confining the plastic between at least two juxtaposed surfaces exerting pressure on the plastic and by driving plastic with plastic, final shaping to a thin-walled body is achieved advantageously from a relatively thick slug or blank of the linear polymer to attain a very high increase in strength of the body, preferably so as to increase the tensile strength while decreasing the thickness gradually from the base toward the mouth of the shell.

This is done at a wide range of working temperatures below the crystalline melt temperature of the material and at speeds of compressive deformation limited to prevent an excessive rise in temperature, which is maintained preferably at an elevated temperature range less than the crystalline melt temperature. For polyethylene the working temperatures are held well below the range from about 257° F. to about 265° F., and working occurs preferably from about 200° F. to slightly below 265° F. for available grades and makes of the thermoplastic, working at about 240° F. being found suitable for most materials of this type. For polypropylene, the limiting temperature is somewhat higher and forming occurs below the much wider range from about 275° F. to about 330–335° F. Somewhat higher working temperatures from about 200° F. up to slightly less than 335° F. are contemplated. By compression forming according to this invention, shaping of an article by deformation can occur over a broad range of temperatures below the crystalline melt temperature rather than in a sharply limited narrow range of temperature hovering extremely closely to such crystalline melt temperature, and difficult to maintain.

The crystalline melt temperature of thermoplastic materials such as these is the elevated temperature at which all crystallinity of the polymer structure disappears and it appears clear when viewed through crossed Nichol prisms in a hot-stage microscope. The degree of crystallinity, as determined by various methods such as the X-ray diffraction method, is preferably as high as possible for each material; for polypropylene a high degree of isotacticity is also preferred along with maximum possible crystallinity.

Figure 5:
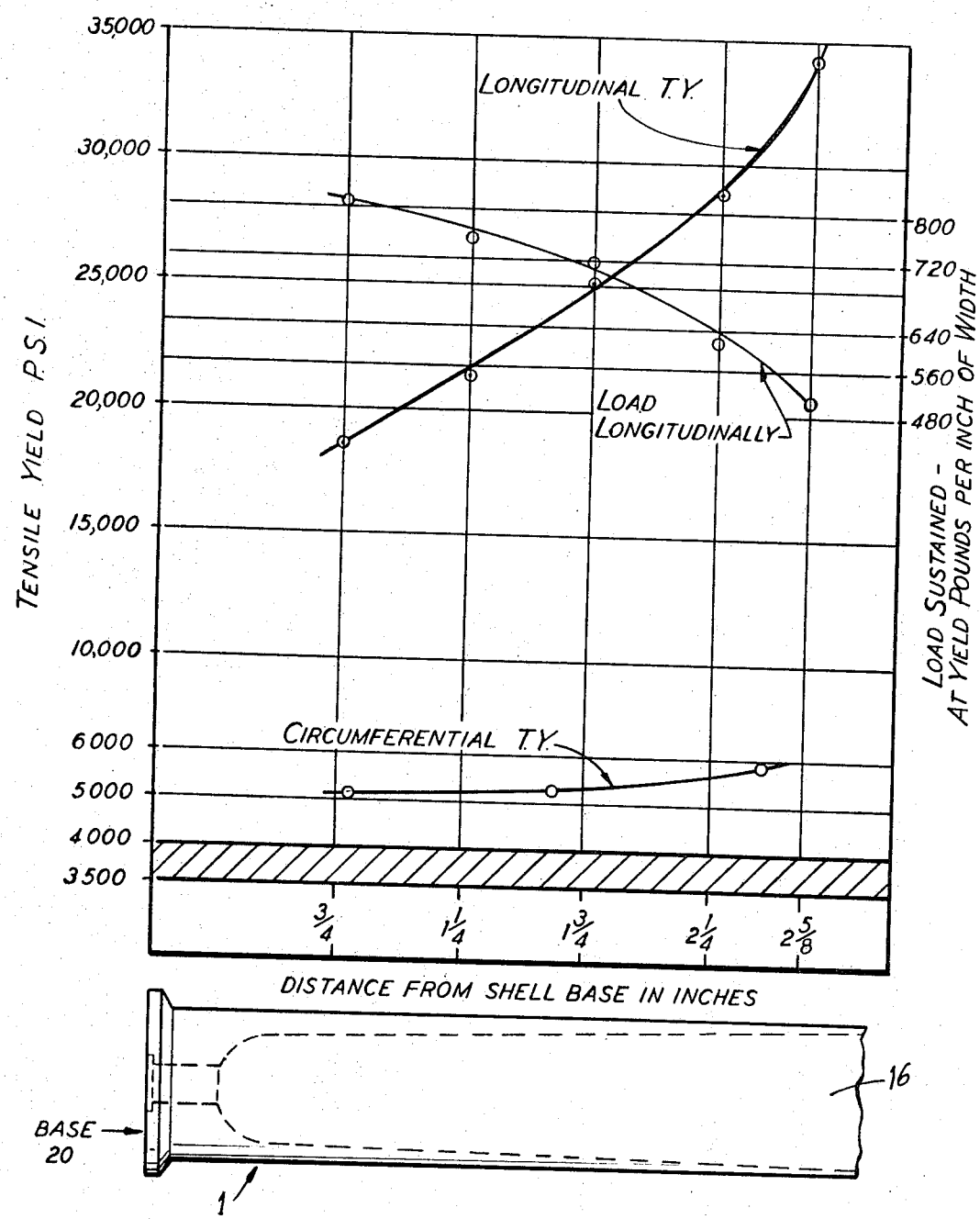
FIG. 5 is a graphic representation of the strength characteristics obtainable with reference to a typical finished cartridge case of this invention shown semi-diagrammatically at the foot of the representation.

By compressive deformation instead of stretching, necking of the thermoplastic is avoided and very high tensile strength is obtained where needed as shown in FIGURE 5. Compression forming also allows the various parts of the finished article also to be made to different finished dimensions, an advantage which is not secured when material must be stretched out of one part depleting it to supply another as the finished product.

It will be appreciated that this invention is especially of advantage in making in one piece an article having at least two portions differing in shape and function, at least one of which must be stronger than another or which must be thicker than other parts which nevertheless must be nearly as strong or stronger. By this invention at least a superior shell tube is formed, or preferably a superior whole shell case.

Figure 4:
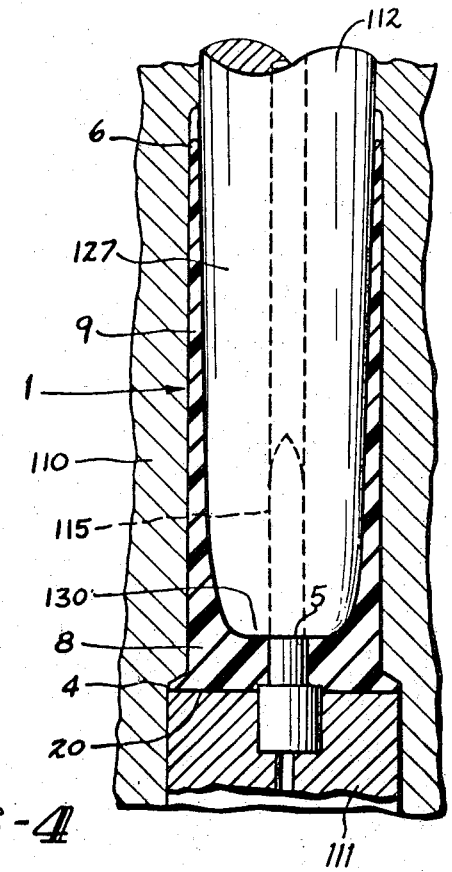
FIG. 4 shows in cross section a portion of one suitable apparatus for processing the blanks to form the substantially completed shot shell also shown in cross section.

According to this invention there is provided a shot shell body 1 shown in FIGURE 4 compression shaped from a blank of polyolefin of the high density type, e.g. a low pressure Ziegler process type of polyethylene.

Figure 1:
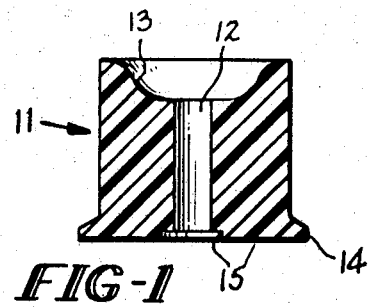
FIG. 1 is an elevational view in cross section showing one embodiment of blank or slug according to this invention.

The shot shell is compression formed from a suitable blank which is a unitary piece as free as possible from discontinuities and laminations; therefore, final formation must not occur from a particulate material directly. As shown in FIGURE 1, the blank is a relatively thick cylindrical slug in the form of a cup or thick walled tube 11, for example, having central bore 12 one end of which at 15 is adapted to receive a primer while the other is contoured as by being dished at 13 to adapt this end for axial compression forming. Externally, the other end of the tubular blank opposite the concavity 13 has a shot shell rim 14 for shell extraction. At this end, corresponding to the base 20 of the finished shell, the exterior of the blank preferably has the shape and size of the shell end.

Figure 3:
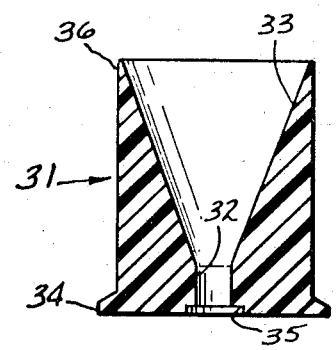
FIG. 3 is an elevational view in cross section showing a preferred embodiment.
Figure 2:
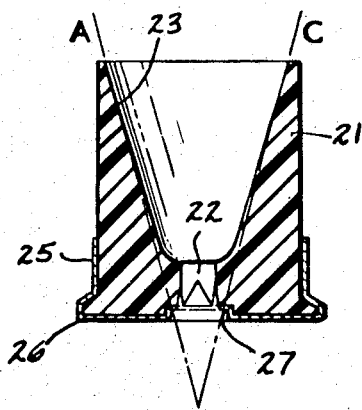
FIG. 2 is an elevational view in cross section showing a second embodiment of blank contemplated.

Typical blanks of one type are shown in FIGURES 1 and 3, in both of which the blank is substantially all plastic. Alternative to the all-plastic slug, as shown in FIGURE 2, the slug may be a plastic core 21 formed symmetrically about opening 22 to be seated in a substantially finished shot shell head. This is a thin metal jacket 25 rimmed at 26 and indented inwardly at the bore forming there a primer retaining flange or fingers 27. The slugs may be of various types formed in any suitable manner preferably by injection molding carefully performed in a die to avoid the occurrence of undesired residual stresses and lamination. One end is contoured to a concavity to suit the article to be compressively formed.

A prolate concavity such as the parabolic or hyperbolic recess 23 of FIGURE 2 is preferred having an interior surface asymptotic or tangential to the sides of the included angle ABC of about 40° at B, i.e., an angle of from about 15° to about 25° with a side as at A and C. Preferably there is provided a blank 31, FIGURE 3, from the central aperture 32 of which the concavity flares conically at 33 forming an angle of about 20° at the edge 36. Concentrically with opening 32 and the tapered concavity 33, the blank has rim 34 and the primer rim countersink 35.

Each blank may be cut and machined from extruded rod and/or tubing. The blank of FIGURE 2 may advantageously be made by injection molding the blank directly into a rimmed metal cup 25 of final finished size lining the injection molding die.

In apparatus for practicing the invention as shown in copending application Ser. No. 135,569, filed Sept. 1, 1961, the primary parts are the hollow die body 110 for receiving the thermoplastic blank, the die base 111 forming an abutment at one end of body 110, and the forming punch 112. The punch cooperates with a reduced extension 115 for sizing the opening 112 of blank 111, for example.

According to this process, the punch is driven into the die assembly to compress the plastic blank at speeds far below the high impact extrusion speeds encountered in metal forming and which are capable of causing liquefaction of the material impacted, a condition avoided in the process.

Punch 112 has intermediate its ends a tapered outer surface 127 uniformly tapered on a side at a rate of about 0.003 of an inch per lineal inch to converge toward the end 130 which in turn is nearly flat ended, beveled gradually at the corner and finally tapered more steeply at an angle of about 20° to merge into the more gentle tapered surface 127. This end forms the inner end of the hollow interior of the finished shell 1. The die cavity converges by a uniform taper on a side at a rate of about 0.003 of an inch per lineal inch.

In operation, by the process of this invention, a thermoplastic blank 31 of No. 12 shot shell gauge and of linear high density polyethylene, for example, was placed in the die cavity after the apparatus as well as the blank were heated through and through in any suitable manner as by immersion to a working temperature of about 240° F. Temperature as low as 70° F. have been tried but at least 200° F. is preferred. The rigid polyethylene blank, preferably after being given a coating of a suitable lubricant such as ethylene glycol, was then compressed. No part of the case was subjected to drawing or stretching or extrusion, as these are conventionally practiced in the resinous plastic industry.

As shown in FIGURE 4, in all instances the finished cartridge case of rigid polyolefin has projected out of the slug a thin-walled portion 9 and a rather bulky head 8 of improved rigidity needed for percussive ignition. The resulting finished head is rigidified about primer opening 5 to final finished size by the compressive forming operation. Integral and concentric therewith the finished tubular sidewall 9 contains more highly deformed thermoplastic coextensive with the periphery of the slug. This provides adequate strength in the sidewall with desired bearing capacity does not fall off longitudinally as rapidly as with plastic tubing of uniform tensile strength from end to end.

Improvement and variation of strength both longitudinally and circumferentially is shown in FIGURE 5 in comparison with the strength of the untreated plastic which falls in or close to the shaded area. Adjacent the base 20, at a wall thickness of about 42 mils, a longitudinal tensile yield of about 19,000 p.s.i. is attained. At the other end 16, at a thickness of about 15 mils, this rises to nearly 35,000 p.s.i., or about ten times that of the untreated linear polyethylene.

Data typical of variation and improvement obtained along the length of the shell tube 9 is indicated in the following tabulation with reference to the representation of FIGURE 5:

TABLE

| Distance from base 20 in inches | 3/4 | 1 3/16 | 1 1/4 | 1 5/8 | 1 3/4 | 2 1/4 | 2 7/16 | 2 5/8 |
|---|---|---|---|---|---|---|---|---|
| Av. Wall thickness in mils | 41.8 | 41.9 | 34.7 | 31.4 | 28.6 | 21.7 | 18.7 | 14.9 |
| Av. Tensile yield strength in p.s.i., longitudinally* | 19,215 | --------- | 21,725 | --------- | 25,145 | 28,800 | --------- | 34,400 |
| Load sustained in pounds, longitudinally on 1/8 inch width | 802 | --------- | 754 | --------- | 719 | 625 | --------- | 512 |
| Av. Tensile yield strength in p.s.i., circumferentially* | --------- | 5,080 | --------- | 5,350 | --------- | --------- | 5,720 | --------- |

*Measured with an "Instron" testing machine, Model TTB, at a rate of load application of two inches per minute.

variation from end to end as shown in FIGURE 5, despite its being less bulky than the head portion 8.

The side wall taper in thickness was found best for compressive forming and best for a shot shell. The finished side wall is thickest adjacent the head and terminates in a thinnest part 6 at the open end where the shell is adapted by this thinness for any suitable closure. Here the shell is adapted especially for closure by in-folding and sealing integrally with the rest of the shell case or any other equivalent closure of evanescent character as disclosed in U.S. Patent 2,582,125 granted to R. S. Holmes.

By this process the need for separate heat-setting after treatments, such as a dimension fixing heat treatment, is avoided.

Head 8 has a primer receptacle 5 as well as the extraction rim 4 provided in the blank.

By the apparatus shown, it is possible to obtain desired accuracy of concentricity of the head and side wall parts despite the tremendous compressive pressure acting on the punch.

While it is contemplated that articles be made according to this invention essentially from polyethylene, polypropylene, other olefinic polymers and their copolymers, the plastic may be compounded with small amounts of suitable antioxidants, coloring agents, opacifiers, and fillers such as those described in U.S. Patent No. 2,466,038.

The finished rigid polyethylene case is not only more waterproof than a conventional paper cartridge but also free from shrinkage and swelling as a result of moisture changes. The shell has dimensional stability even over a wide operative range of temperatures, is substantially scuffproof because of its elasticity, and being substantially free of fugitive antioxidants and plasticizers, it does not change in size and pliancy. The shell being of a self-lubricating character needs no extraneous lubricant. The shell and its powder charge do not suffer from migration of these components. In the side wall, closure end shootoffs are substantially eliminated by the permanently enhanced strength which does not diminish on aging of the shell.

Desired uniformity of wall thickness, deformation and strength, circumferentially is obtained. Longitudinally desired tensile yield strengths of about 19,000 to about 35,000 p.s.i. are regularly achieved with linear polyethylene of the highest molecular weights, which is considerably above the strength obtained by merely injection molding the most rigid form of the plastic. Toward the open end the tensile yield strength varies upwardly so that despite the decreased thickness of the wall there, the load It will be understood that while this invention is particularly applicable to the manufacture of shot shells, it is also applicable to making other hollow articles of the type open at least at one end.

Modifications can be made to a number of article embodiments with or without a flange and/or with or without the closed end.

Where only an open-ended tube is desired, the blank may be reduced in height and may be otherwise suitably modified so that in the finished product, end 8 may be cut off leaving tubular part 9 having desired variation of strength over its length.

A typical 12 gauge shot shell made has a head of at least 0.150 of an inch thickness at the primer opening 5 and an outside diameter next the extraction rim 4 of about 0.800 of an inch. From the 0.800 the diameter of the tube decreases to about 0.785 at the open end where the thickness is around 0.020 of an inch. At the head the tube thickness is about 0.040 of an inch. This shell is made from a thick cylindrical blank having an outer diameter of about 0.800 of an inch, exclusive of the rim, an inner diameter of about 0.230 of an inch at the bore, and a minimum height at the perforation of about that of the finished opening 5 and an overall height of about 1 or 1 1/8 inch. Tube lengths produced are at least from about 2 to 3 inches.

In all embodiments and examples, the distal end of the case remote from the base may be trimmed as necessary to provide the shape of edge desired, and different from that obtained by compressive deformation.

It will be further understood that those skilled in the art may make other changes and modifications in the embodiments now believed preferred without departing from the spirit and scope of the invention as set forth in the appended claims.

What is claimed is:

1. A blank formed of a crystalline plastic material adapted to be deformed into a one piece shotshell casing having a tubular sidewall and greatly increased tensile strength relative to the tensile strength of said blank and an integral base at one end, said blank comprising a cylindrical body having an outside diameter substantially the same as the diameter of the shotshell casing to be formed, one end of said body having a concavity formed therein concentric with the longitudinal axis of said body, said concavity converging inwardly from adjacent said one end to form an angle with the outer surface of said blank of from about 15° to 25°.

2. A blank of crystalline olefinic material adapted to be deformed into a one piece shotshell casing of predetermined gauge, said blank comprising a substantially cylindrical body, a conical concavity formed at one end of said body converging toward a substantially cylindrical primer opening formed in the other end of said body, said conical concavity being concentrically formed about the longitudinal axis of said body and forming a central included angle of from about 30° to about 50°.

3. The blank of claim 2 in which a rim formed integral with said body extends radially outward from said other end.

References Cited

UNITED STATES PATENTS

| 3,093,073 | 6/1963 | Lockwood et al. | 102—43 X |
| 3,164,090 | 1/1965 | Williams et al. | 102—43 |
| 3,276,375 | 10/1966 | Larson | 102—43 |

FOREIGN PATENTS 1,146,646  5/1957  France.

BENJAMIN A. BORCHELT, *Primary Examiner.*

ROBERT F. STAHL, *Examiner.*